US006919567B2

(12) United States Patent
Iwasawa

(10) Patent No.: US 6,919,567 B2
(45) Date of Patent: Jul. 19, 2005

(54) ACTIVE INFRARED SENSOR

(75) Inventor: Masashi Iwasawa, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 219 days.

(21) Appl. No.: 10/354,143

(22) Filed: Jan. 30, 2003

(65) Prior Publication Data

US 2003/0141454 A1 Jul. 31, 2003

(30) Foreign Application Priority Data

Jan. 31, 2002 (JP) .................................... 2002-023104

(51) Int. Cl.[7] .............................................. G01J 5/02
(52) U.S. Cl. .............................................. 250/341.1
(58) Field of Search .................................... 250/341.1

(56) References Cited

U.S. PATENT DOCUMENTS 4,516,115 A * 5/1985 Frigon et al. ............... 340/556
5,142,398 A * 8/1992 Heep .......................... 398/112
5,675,150 A * 10/1997 Kunz ....................... 250/341.1
6,476,947 B1 * 11/2002 Harvey ...................... 398/106

FOREIGN PATENT DOCUMENTS

JP 2001-188970 7/2001

* cited by examiner

*Primary Examiner*—Constantine Hannaher
(74) *Attorney, Agent, or Firm*—Wenderoth, Lind & Ponack, L.L.P.

(57) ABSTRACT

An optical transmitter is equipped with a transmitted pulse modulator at which a plurality of optical transmission patterns have previously been stored. The respective stored optical transmission patterns have mutually different ratios between infrared pulse ON times and OFF times. The optical output of infrared signal(s) transmitted from an optical transmitter is made variable as a result of the fact that infrared pulse(s) output during infrared output period(s) is/are output in accordance with an optical transmission pattern which is selected from among the plurality of optical transmission patterns.

8 Claims, 7 Drawing Sheets

ACTIVE INFRARED SENSOR

BACKGROUND OF THE INVENTION

1. Field of the Invention

The present invention relates to an active infrared sensor which may be used in security systems and the like. In particular, the present invention pertains to an improvement for making variable the transmitted optical output from an optical transmitter means.

2. Description of the Related Art

As disclosed, for example, in Japanese Patent Application Publication Kokai No. H13-188970 (2001), applications in which active infrared sensors are used in security systems to detect the entry of persons into protected areas are conventionally known. Such sensors are typically equipped with optical transmitters employing internal optical transmitter elements, and optical receivers employing internal optical receiver elements. Such optical transmitter(s) and optical receiver(s) might be arranged in opposing fashion so as to straddle a protected area such that infrared beam(s) from the optical transmitter(s) is/are transmitted toward the optical receiver(s). Moreover, when infrared beam(s) being transmitted from the optical transmitter(s) to the optical receiver (s) is/are interrupted by intruder(s), causing a change in the amount of light that is received by the optical receiver element(s), a security camera might, for example, be activated or a security company might be contacted.

However, changes in environment and/or conditions under which they are used may cause the optical receiver elements of such infrared sensors to become saturated, thereby preventing satisfactory detection. A specific description thereof follows. Various types of such infrared sensors are available, corresponding to the different sizes of protected areas in which they are intended to be used. For example, there are sensors for use with distances of on the order of 100 m between the optical transmitter and the optical receiver, there are sensors for use with distances of on the order of 20 m therebetween, and so forth. A transmitted optical output from the optical transmitter is set in advance so as to be higher in the case of the former as compared with the latter.

Moreover, when the former—i.e., infrared sensors intended for separations of 100 m—are used in applications involving comparatively narrow protected areas, e.g., where the distance between optical transmitter and optical receiver is on the order of 20 m, the intensity of the so-called feedback beam which is produced when infrared light that is reflected by objects (e.g., wall surfaces or ground surfaces) in the vicinity of the sensor other than the objects being detected and which irradiates the optical receiver can become comparatively large. As a result, despite the fact that an intruder or the like may have passed between an optical transmitter and an optical receiver, interrupting the infrared beam therebetween, because this feedback beam irradiates the optical receiver, the optical receiver is unable to detect an interruption of the infrared beam by the intruder or the like, which results in an undetected intrusion event. Particularly where water has collected on the ground as a result of rainfall or snow has accumulated as a result of snowfall, there is a tendency for the intensity of this feedback beam to become large, thereby increasing the likelihood of occurrence of an undetected intrusion event. Furthermore, during times of such rainfall or snowfall, it is possible that the intensity of the feedback beam will increase and that an undetected intrusion event will occur even where the infrared sensor which is employed is of a type that is designed for the size of the protected area in question (e.g., where optical transmitter(s) and optical receiver(s) of infrared sensors which are intended for separations of 20 m are installed such that they are separated by on the order of 20 m).

In order to remedy such shortcomings, it has been proposed, as disclosed in Japanese Patent Application Publication Kokai No. H5-174260 (1993), for example, that the transmitted optical output from the optical transmitter(s) be made variable. That is, a constitution is adopted wherein the optical transmitting circuit is equipped with a current limiting circuit, and the resistance of a variable resistor which is provided at this current limiting circuit is varied as necessary so as to permit an adjustment of the transmitted optical output. For example, in the event of the aforementioned circumstances tending to cause the intensity of the feedback beam to become large, resistance at the variable resistor might be increased so as to reduce the transmitted optical output. This allows for the intensity of the feedback beam to be held to a low value, thereby permitting an accurate detection of the interruption of the infrared beam as a result of passage therethrough by the foregoing intruder or the like.

However, because the means for making transmitted optical output variable which is disclosed in the foregoing publication requires complicated electrical circuitry, in practice, it is only actually possible to switch between on the order of two levels of transmitted optical output.

Moreover, with a device such as this, which only permits switching between on the order of two levels, depending on the environment and/or the conditions under which the infrared sensor is used, it may not be possible to completely eliminate the aforementioned shortcomings which are caused by the feedback beam.

While a constitution that would permit switching among multiple levels of transmitted optical output has therefore been desired, a practical solution has been difficult because of the concomitant increased complexity in electrical circuitry which would result therefrom as described above.

The present invention was conceived in light of such issues, and therefore, an object of the present invention is to make it possible for the transmitted optical output in an active infrared sensor to be made variable without the need for complicated electrical circuitry, and to make it possible to carry out multilevel adjustment of transmitted optical output as a result thereof.

SUMMARY OF THE INVENTION

In order to achieve the foregoing object, one or more embodiments of the present invention may be such that the transmitted optical output, as determined by value(s) of integrated optical energy that is transmitted during infrared output period(s), is capable of being changed as a result of an adjustment of ratio(s) between infrared pulse ON time(s) and OFF time(s) during such infrared output period(s). That is, the optical output of the transmitted infrared signal(s) may be made variable while output value(s) of the respective infrared pulse(s) is/are themselves held constant.

More specifically, one or more embodiments of the present invention is/are predicated upon an active infrared sensor which is equipped with one or more optical transmitter means for transmitting one or more infrared signals toward one or more protected areas, where the entry of one or more objects into at least one of the protected area or areas is detected when at least one of the infrared signal or signals transmitted from at least one of the optical transmitter means is interrupted. In such an active infrared sensor, at least one of the infrared signal or signals transmitted from at least one of the optical transmitter means may be produced by a repeated alternation between one or more infrared output periods and one or more infrared non-output periods, where a plurality of infrared pulses are output during at least one of the infrared output period or periods. Moreover, one or more transmitted pulse modulation means may be provided, and the optical output of at least one of the infrared signal or signals transmitted from at least one of the optical transmitter means is made variable as a result of an adjustment of at least one ratio between the infrared pulse ON time and OFF time during at least one of the infrared output period or periods.

As a result of such specific features, by choosing large ratio(s) of infrared pulse OFF time(s) relative to ON time(s), it is possible to attain small value(s) of integrated optical energy that is transmitted during infrared output period(s) and low optical output in the infrared signal(s) transmitted from optical transmitter means. Conversely, by choosing mall ratio(s) of infrared pulse OFF time(s) relative to ON time(s), it is possible to attain large value(s) of integrated optical energy that is transmitted during infrared output period(s) and high optical output in infrared signal(s) transmitted from the optical transmitter means. That is, this makes it possible for the transmitted optical output to be made variable through the adjustment of ratio(s) between infrared pulse ON time(s) and OFF time(s), which is something that can be implemented through software control alone; and makes it possible to carry out a multileveled adjustment of the transmitted optical output without the need for complicated electrical circuitry, which is something that would involve hardware design.

The following may be presented as examples of specific techniques for making the optical output of infrared signal(s) transmitted from the optical transmitter means variable.

In one such technique, the optical output of at least one of the infrared signal or signals transmitted from at least one of the optical transmitter means is made variable by varying the number of the infrared pulses during at least one of the infrared output period or periods while the duration or durations of this/these infrared output period(s) is/are held constant.

In another such technique, the optical output of at least one of the infrared signal or signals transmitted from at least one of the optical transmitter means is made variable by varying the width of at least one of the infrared pulses during at least one of the infrared output period or periods while the duration or durations of this/these infrared output period(s) is/are held constant.

In yet another such technique, the optical output of at least one of the infrared signal or signals transmitted from at least one of the optical transmitter means is made variable by varying the duration of at least one of the infrared output period(s).

The use of these techniques either individually or in mutual combination makes it possible to switch among multiple levels of the transmitted optical output.

The following may be presented as examples of the specific techniques for adjusting the ratio(s) between infrared pulse ON time(s) and OFF time(s) during such infrared output period(s).

In one such technique, a plurality of optical transmission patterns having mutually different ratios between infrared pulse ON times and OFF times are previously stored at at least one of the transmitted pulse modulation means, where the optical output of at least one of the infrared signal or signals transmitted from at least one of the optical transmitter means is made variable as a result of the fact that at least one of the infrared pulses outputted during at least one of the infrared output period(s) is output in accordance with an optical transmission pattern which is selected from among the plurality of optical transmission patterns.

In another such technique, at least one of the transmitted pulse modulation means is equipped with at least one first sending circuit which is capable of determining at least one frequency of at least one set of infrared pulses to be output during at least one of the infrared output period(s), and at least one second sending circuit which is capable of determining one or more durations of one or more ON times of one or more infrared pulses outputted during at least one of the infrared output period(s). Furthermore, at least one control signal from each of these sending circuits may be ANDed together, and the optical output of at least one of the infrared signal or signals transmitted from at least one of the optical transmitter means may be made variable as a result of the output of at least one set of infrared pulses at this frequency and having this/these ON time duration(s) during at least one of the infrared output period(s).

Such techniques make it possible to cause infrared pulses outputted during infrared output period(s) to be output in accordance with the selected or generated optical transmission pattern(s), as a result of which the optical output of the infrared signal(s) transmitted from the optical transmitter means is made variable. In particular, where infrared pulses are output at frequency or frequencies and with ON time duration(s) as determined by the respective aforementioned sending circuits, there is no need to prepare and store a plurality of optical transmission patterns in advance, thereby permitting reductions to be achieved in the required storage capacity and making it possible to inhibit increases in infrared sensor cost.

Furthermore, if at least one of the optical transmitter means and/or at least one of the optical receiver means is/are provided with at least one activation means for activating at least one functionality by means of which at least one of the transmitted pulse modulation means varies transmitted optical output, it will be possible to cause varying of optical output of transmitted infrared signal(s) to be carried out automatically. This means that there will no longer be a need for a user to perform operations for varying transmitted optical output in correspondence to the environment and/or the conditions under which the infrared sensor is used.

Furthermore, it will also be possible to cause varying of the optical output of transmitted infrared signal(s) to be carried out automatically if at least one of the optical receiver means is provided with at least one request sending means which is capable of sending to at least one of the optical transmitter means at least one request signal for requesting action of at least one functionality by means of which at least one of the transmitted pulse modulation means varies the transmitted optical output.

DETAILED DESCRIPTION OF THE PREFERRED EMBODIMENTS

Below, embodiments of the present invention are described with reference to the drawings. In the embodiments which follow, the present invention is described in terms of an example in which it is applied to a sensor for detecting the entry of persons into protected areas (regions with respect to which detection is carried out), such as may be employed in security systems or the like installed in offices, factories, or the like for nighttime monitoring thereof.

First Embodiment

Figure 1:
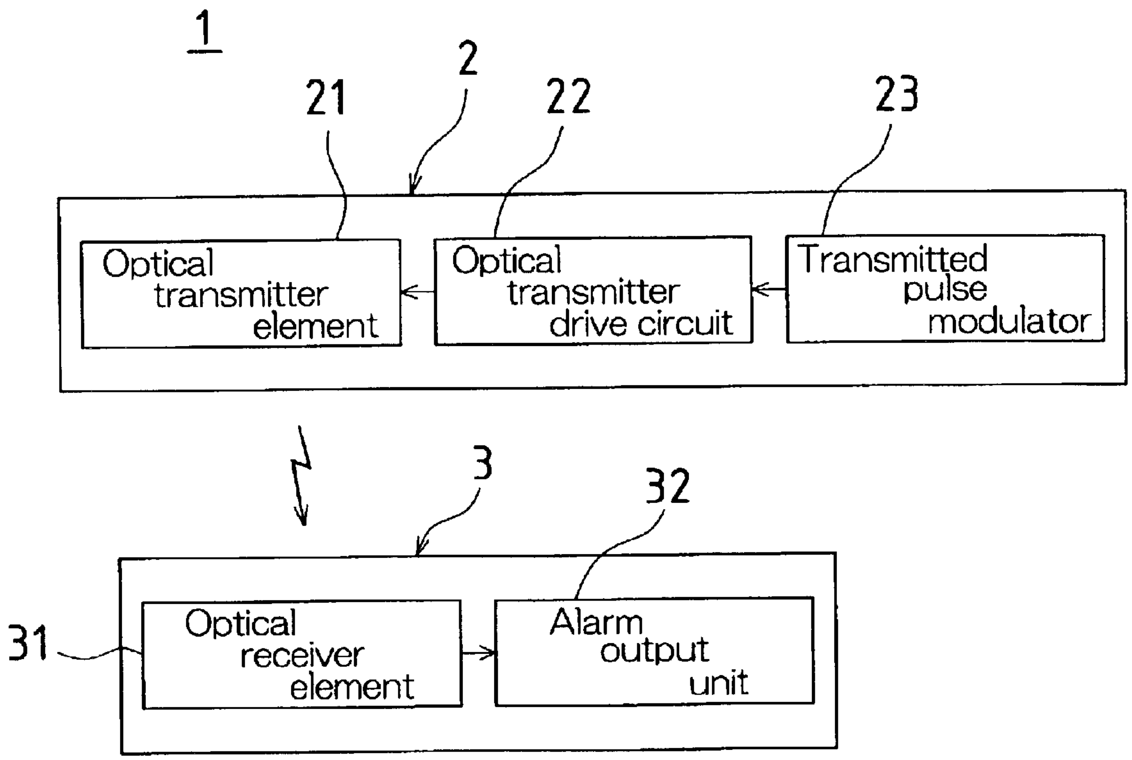
FIG. 1 is a block diagram showing the constitution of an active infrared sensor according to a first embodiment of the present invention.

A first embodiment of the present invention will now be described. FIG. 1 is a block diagram showing the constitution of an active infrared sensor 1 according to the first embodiment of the present embodiment. Such an active infrared sensor 1 might be installed at a prescribed protected area, and might output an alarm to a system control panel (not shown) which activates a security camera (not shown) or which contacts a security company when the entry of a person into such protected area is detected.

As shown in FIG. 1, the active infrared sensor 1 is such that optical transmitter(s) 2 serving as optical transmitter means and optical receiver(s) 3 serving as optical receiver means are arranged in protected area(s) in opposing fashion with prescribed distance(s) therebetween along an optical axis or axes traveled by infrared pulses which are transmitted by the optical transmitter(s) 2 and described below.

Such an optical transmitter 2 is equipped with optical transmitter element(s) 21 and optical transmitter drive circuit(s) 22 for driving such optical transmitter element(s) 21. Such an optical transmitter element 21 transmits infrared pulses (pulsed light) in the form of near-infrared beam(s). The timing with which such infrared pulses are transmitted is determined by the optical transmitter drive circuit 22. More specifically, the transmission of such infrared pulses may occur as a result of a repeated alternation between infrared output period(s) and infrared non-output period(s), where a plurality of infrared pulses are output during the infrared output period(s). A more detailed description is given below regarding the timing with which such plurality of infrared pulses may be output during the infrared output period(s).

Turning now to the optical receiver(s) 3, such an optical receiver 3 is equipped with optical receiver element(s) 31 and alarm output unit(s) 32. Such an alarm output unit 32 senses whether infrared pulses have been received at the optical receiver element 31, and, in the event that either a condition wherein such infrared pulses are not received or a condition wherein the amount of light that is represented by the received infrared pulses is reduced persists for a prescribed period of time, the alarm output unit 32 determines that the change in the amount of light which is received at optical receiver element 31 is due to an interruption of the near-infrared beam by an intruder, in which case the alarm output unit 32 outputs an alarm to a system control panel (not shown) for the purpose of activating a security camera or contacting a security company.

Furthermore, the distinctive feature of the first embodiment lies in the fact that transmitted pulse modulator(s) 23 serving as transmitted pulse modulation means is/are provided at the foregoing optical transmitter(s) 2. Such a transmitted pulse modulator 23 is described below.

The transmitted pulse modulator 23 outputs, to the optical transmitter drive circuit 22, control signal(s) for adjusting ratio(s) between infrared pulse ON time(s) and OFF time(s) during the foregoing infrared output period(s), as a result of which the optical output of the infrared signal(s) transmitted from the optical transmitter element(s) 21 is made variable. More specifically, a plurality of infrared pulse optical transmission patterns are stored in advance at the transmitted pulse modulator 23. Moreover, one of the optical transmission patterns is selected in correspondence to the environmental conditions and/or the conditions under which infrared sensor 1 is used, and this selected optical transmission pattern is used to transmit a near-infrared beam toward the optical receiver 3.

At (a) in FIGS. 2 through 8, examples of the optical transmission patterns which may be stored at such a transmitted pulse modulator 23 are shown. Furthermore, at (b) in FIGS. 2 through 8, the waveforms of pulses which are received at the optical receiver 3 when near-infrared beams pursuant to the foregoing respective optical transmission patterns are transmitted toward the optical receiver 3 are shown. Moreover, at (b) in FIGS. 2 through 8, the dashed line indicates an actual pulse waveform as received in accompaniment to the infrared pulse output, and the solid line indicates an average received pulse waveform as derived therefrom. The height (amplitude) of the received pulse waveform shown herein is determined by the optical output of the infrared signal which is transmitted from the optical transmitter element 21. Moreover, the infrared signals which may be transmitted from the optical transmitter element 21 differ mutually with respect to optical output in correspondence to which of the respective optical transmission patterns is employed.

The specific optical transmission patterns indicated by way of example in the drawings are described below. FIG.

2 shows an example in which the ratio between the infrared pulse ON time and OFF time during a prescribed infrared output period is chosen to be 1:3, and in which the number of infrared pulses during this infrared output period is chosen to be 4. More specifically, infrared output period A1 is chosen to be 130 μs, infrared non-output period B1 is chosen to be 500 μs, infrared pulse ON time T1 is chosen to be 10 μs, and infrared pulse OFF time T2 is chosen to be 30 μs. The optical output of the transmitted infrared signal in the present case is V1.

Figure 2:
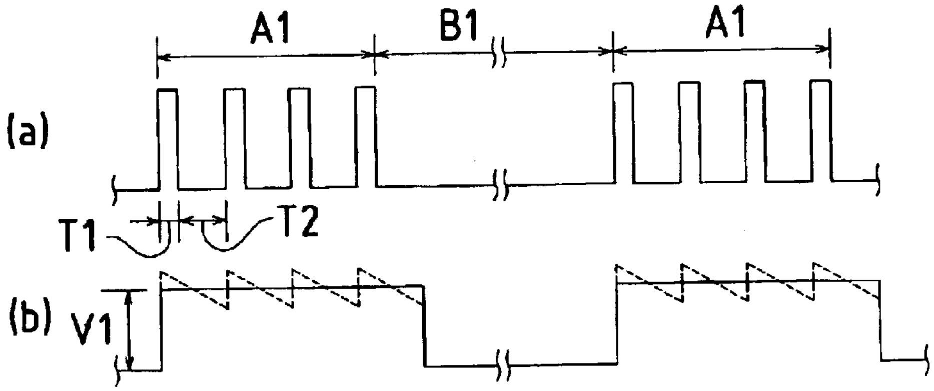
FIG. 2(*a*) is a drawing showing a first optical transmission pattern which is stored at a transmitted pulse modulator, and FIG. 2(*b*) is a drawing showing a transmitted optical output waveform corresponding thereto.
Figure 3:
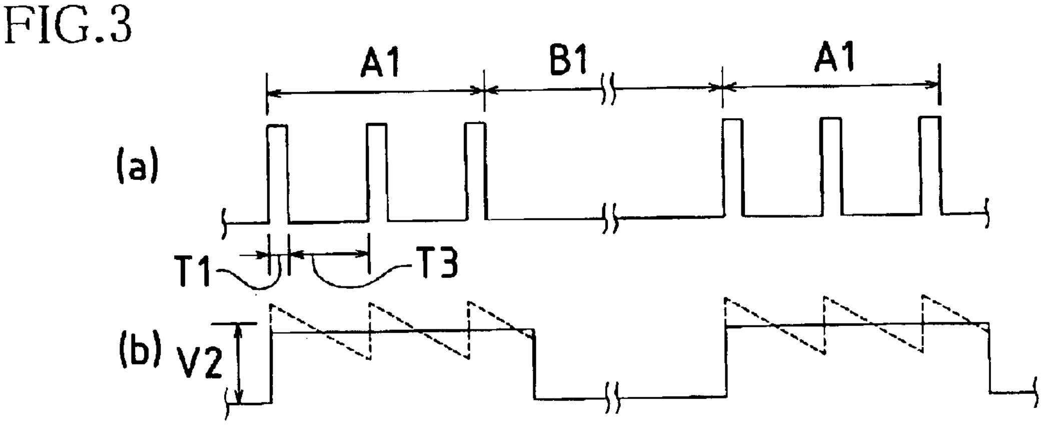
FIG. 3(*a*) is a drawing showing a second optical transmission pattern which is stored at a transmitted pulse modulator, and FIG. 3(*b*) is a drawing showing a transmitted optical output waveform corresponding thereto.

FIG. 3 shows an example in which the ratio between the infrared pulse ON time and OFF time during a prescribed infrared output period is chosen to be 1:5, and in which the number of infrared pulses during this infrared output period is chosen to be 3 (there being 1 less pulse than was the case in the situation shown in FIG. 2). More specifically, infrared output period A1 is chosen to be 130 μs, infrared non-output period B1 is chosen to be 500 μs, infrared pulse ON time T1 is chosen to be 10 μs, and infrared pulse OFF time T3 is chosen to be 50 μs. The optical output of the transmitted infrared signal in the present case is V2, which is lower than the optical output in the situation shown in the aforementioned FIG. 2.

Figure 4:
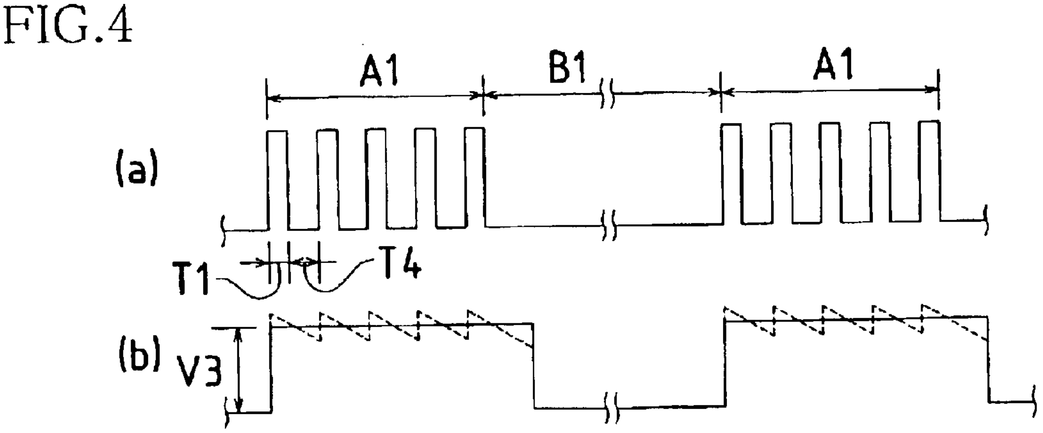
FIG. 4(*a*) is a drawing showing a third optical transmission pattern which is stored at a transmitted pulse modulator, and FIG. 4(*b*) is a drawing showing a transmitted optical output waveform corresponding thereto.

FIG. 4 shows an example in which the ratio between the infrared pulse ON time and OFF time during a prescribed infrared output period is chosen to be 1:2, and in which the number of infrared pulses during this infrared output period is chosen to be 5 (there being 1 more pulse than was the case in the situation shown in FIG. 2). More specifically, infrared output period A1 is chosen to be 130 μs, infrared non-output period B1 is chosen to be 500 μs, infrared pulse ON time T1 is chosen to be 10 μs, and infrared pulse OFF time T4 is chosen to be 20 μs. The optical output of the transmitted infrared signal in the present case is V3, which is higher than the optical output in the situation shown in the aforementioned FIG. 2.

Figure 5:
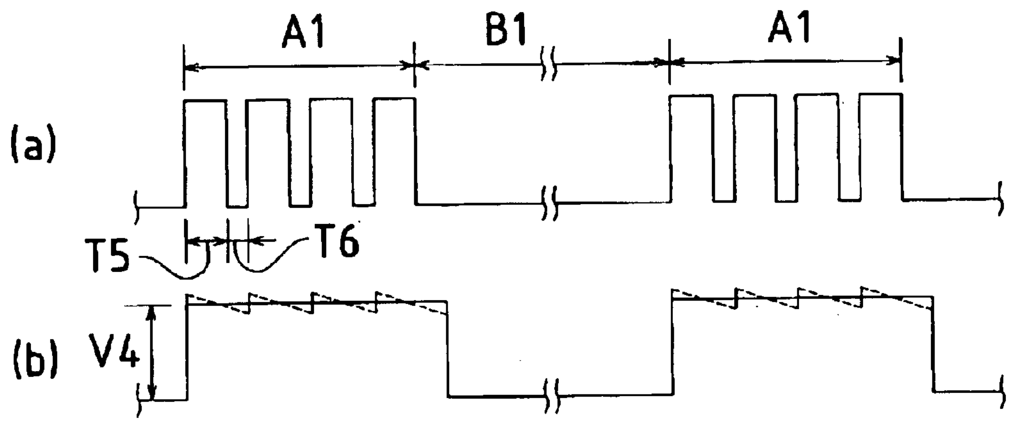
FIG. 5(*a*) is a drawing showing a fourth optical transmission pattern which is stored at a transmitted pulse modulator, and FIG. 5(*b*) is a drawing showing a transmitted optical output waveform corresponding thereto.

FIG. 5 shows an example in which the ratio between the infrared pulse ON time and OFF time during a prescribed infrared output period is chosen to be 5:2, and in which the number of infrared pulses during this infrared output period is chosen to be 4 (there being the same number of pulses as was the case in the situation shown in FIG. 2). More specifically, infrared output period A1 is chosen to be 130 μs, infrared non-output period B1 is chosen to be 500 μs, infrared pulse ON time T5 is chosen to be 25 μs, and infrared pulse OFF time T6 is chosen to be 10 μs. The optical output of the transmitted infrared signal in the present case is V4, which is higher than the optical output in the situation shown in the aforementioned FIG. 2.

Figure 6:
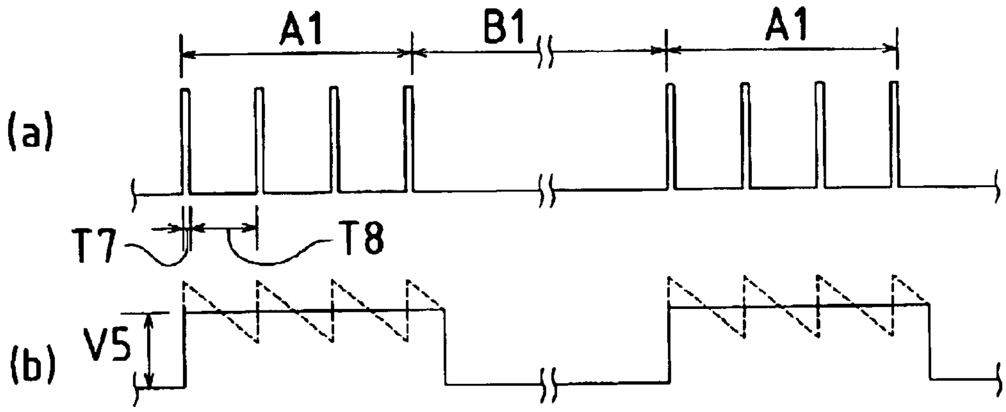
FIG. 6(*a*) is a drawing showing a fifth optical transmission pattern which is stored at a transmitted pulse modulator, and FIG. 6(*b*) is a drawing showing a transmitted optical output waveform corresponding thereto.

FIG. 6 shows an example in which the ratio between the infrared pulse ON time and OFF time during a prescribed infrared output period is chosen to be approximately 1:7, and in which the number of infrared pulses during this infrared output period is chosen to be 4 (there being the same number of pulses as was the case in the situation shown in FIG. 2). More specifically, infrared output period A1 is chosen to be 130 μs, infrared non-output period B1 is chosen to be 500 μs, infrared pulse ON time T7 is chosen to be 5 μs, and infrared pulse OFF time T8 is chosen to be approximately 37 μs. The optical output of the transmitted infrared signal is in the present case V5, which is lower than the optical output in the situation shown in FIG. 2.

Figure 7:
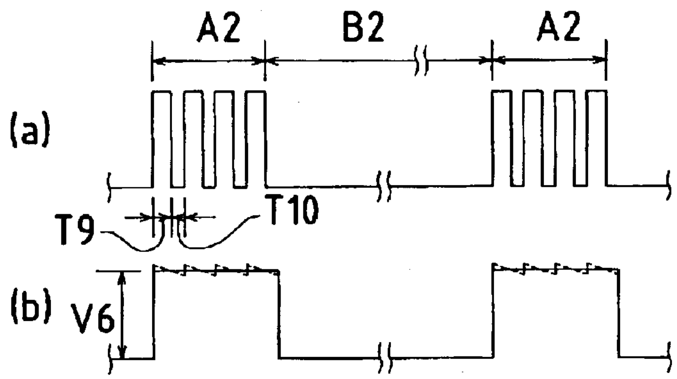
FIG. 7(*a*) is a drawing showing a sixth optical transmission pattern which is stored at a transmitted pulse modulator, and FIG. 7(*b*) is a drawing showing a transmitted optical output waveform corresponding thereto.

FIG. 7 shows an example in which the ratio between the infrared pulse ON time and OFF time during a prescribed infrared output period is chosen to be 2:1, and in which the number of infrared pulses during this infrared output period is chosen to be 4 (there being the same number of pulses as was the case in the situation shown in FIG. 2). More specifically, infrared output period A2 is chosen to be 55 μs, infrared non-output period B2 is chosen to be 500 μs, infrared pulse ON time T9 is chosen to be 10 μs, and infrared pulse OFF time T10 is chosen to be approximately 5 μs. The optical output of the transmitted infrared signal is in the present case V6, which is higher than the optical output in the situation shown in the aforementioned FIG. 2.

Figure 8:
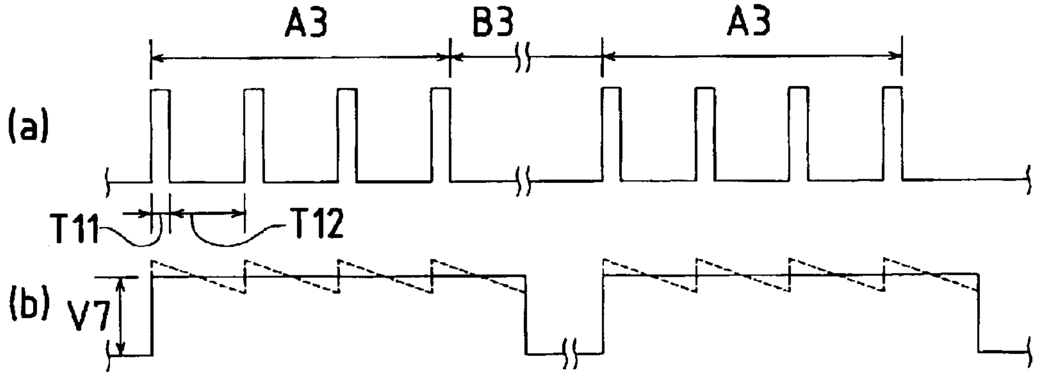
FIG. 8(*a*) is a drawing showing a seventh optical transmission pattern which is stored at a transmitted pulse modulator, and FIG. 8(*b*) is a drawing showing a transmitted optical output waveform corresponding thereto.

FIG. 8 shows an example in which the ratio between the infrared pulse ON time and OFF time during a prescribed infrared output period is chosen to be 1:4, and in which the number of infrared pulses during this infrared output period is chosen to be 4 (there being the same number of pulses as was the case in the situation shown in FIG. 2). More specifically, infrared output period A3 is chosen to be 160 μs, infrared non-output period B3 is chosen to be 500 μs, infrared pulse ON time T11 is chosen to be 10 μs, and infrared pulse OFF time T12 is chosen to be approximately 40 μs. The optical output of the transmitted infrared signal is in the present case V6, which is lower than the optical output in the situation shown in the aforementioned FIG. 2.

Infrared pulse optical transmission patterns such as the foregoing are stored in advance at the transmitted pulse modulator 23. Moreover, one of the optical transmission patterns is selected in correspondence to the environmental conditions and/or the conditions under which infrared sensor 1 is used, and this selected optical transmission pattern is used to transmit a near-infrared beam toward the optical receiver 3.

For example, during times of rainfall or snowfall, under conditions where the amount of light in the aforementioned feedback beam is likely to increase, an optical transmission pattern in which the optical output of the transmitted infrared signal is set to a low value (as is the case, for example, with the optical transmission patterns shown in FIGS. 3, 6, and 8) might be selected, and this selected optical transmission pattern might be used to transmit a near-infrared beam toward the optical receiver 3. Furthermore, where the distance between the optical transmitter 2 and the optical receiver 3 is set so as to be a comparatively small value (e.g., on the order of 10 m), an optical transmission pattern in which the optical output of the transmitted infrared signal is set to a low value might likewise be selected. Conversely, where the distance between the optical transmitter 2 and the optical receiver 3 is set so as to be a comparatively large value (e.g., on the order of 100 m), an optical transmission pattern in which the optical output of the transmitted infrared signal is set to a high value (as is the case, for example, with the optical transmission patterns shown in FIGS. 4, 5, and 7) might be selected.

Such a selection of the optical transmission pattern(s) may be carried out manually through user intervention or may be carried out automatically in correspondence to environmental conditions and/or the conditions under which infrared sensor 1 is used. For example, as an example of automatic selection, the distance between the optical transmitter and the optical receiver may be entered in the form of data or might be detected automatically, thereby permitting optical transmission pattern(s) to be automatically selected and control signal(s) to be output from the transmitted pulse modulator 23 to the optical transmitter drive circuit 22 in correspondence thereto.

As described above, in the first embodiment, one of a plurality of infrared pulse optical transmission patterns which are previously stored at the transmitted pulse modulator 23 is selected in correspondence to the environmental conditions and/or the conditions under which the infrared sensor 1 is used, and this selected optical transmission pattern is used to transmit a near-infrared beam toward the optical receiver 3. This, therefore, makes it possible for transmitted optical output to be made variable without the need for complicated electrical circuitry, and also makes it possible to carry out a multileveled adjustment of the transmitted optical output as a result thereof. Accordingly, it is possible to completely eliminate the aforementioned shortcomings caused by the feedback beam, which varies depending on the environment and/or the conditions under which the infrared sensor 1 is used.

Second Embodiment

A second embodiment of the present invention will now be described. In the infrared sensor of the foregoing first embodiment, the respective optical transmission patterns were stored in advance at transmitted pulse modulator 23. In the second embodiment, desired optical transmission pattern (s) is/are generated at the transmitted pulse modulator 23. As the constitution of the second embodiment is in other respects similar to that of the first embodiment, the description here of the second embodiment will be confined to that structure which is responsible for the generation of the optical transmission pattern(s).

Figure 9:
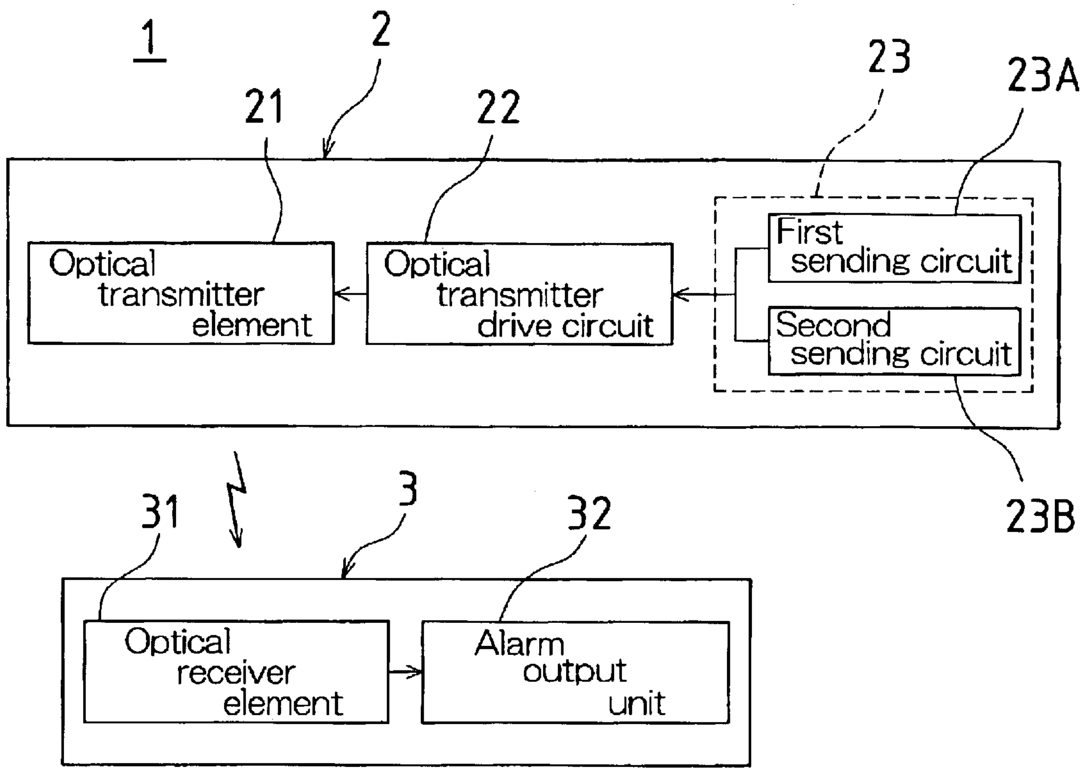
FIG. 9 is a block diagram showing the constitution of an active infrared sensor according to a second embodiment of the present invention.

As shown in FIG. 9, the transmitted pulse modulator 23 of the second embodiment is equipped with first and second sending circuits 23A, 23B. The first sending circuit 23A is a circuit for determining the frequency or frequencies of infrared pulses which are output during infrared output period(s). The second sending circuit 23B is a circuit for determining the duration(s) of ON time(s)—i.e., pulsewidth (s)—of the infrared pulse(s) outputted during the infrared output period(s).

Moreover, by ANDing together the infrared pulse frequency or frequencies and the pulsewidth(s) as determined by these respective sending circuits 23A, 23B, and by outputting the result thereof to the optical transmitter drive circuit 22, it is possible to generate desired optical transmission pattern(s).

For example, if the optical transmission pattern shown in FIG. 2(*a*) is modified by applying thereto an infrared pulse frequency as determined by the first sending circuit 23A which is set so as to be a low value, the result might be an optical transmission pattern as shown in FIG. 3(*a*); or conversely, if the infrared pulse frequency is set so as to be a high value, the result might be an optical transmission pattern as shown in FIG. 4(*a*).

On the other hand, if the optical transmission pattern shown in FIG. 2(*a*) is modified by applying thereto an infrared pulse ON time duration as determined by the second sending circuit 23B which is set so as to be a high value, the result might be an optical transmission pattern as shown in FIG. 5(*a*); or conversely, if the infrared pulse ON time duration is set so as to be a low value, the result might be an optical transmission pattern as shown in FIG. 6(*a*).

In the second embodiment, by combining the infrared pulse frequency or frequencies and pulsewidth(s) as determined by these respective sending circuits 23A, 23B, it is thus possible to generate optical transmission pattern(s) of an arbitrary profile. The second embodiment therefore allows for the optical output of transmitted infrared signal(s) to be switched among multiple levels by means of a transmitted pulse modulator 23 which does not need to have a large storage capacity as compared with that of the first embodiment.

Third Embodiment

A third embodiment of the present invention will now be described. The third embodiment relates to a constitution for causing the optical output of the transmitted infrared signal (s) to be varied automatically. As the constitution of the third embodiment is in other respects similar to that of the foregoing first embodiment, the description here of the third embodiment will be confined to that structure which is responsible for causing the transmitted optical output to be varied automatically.

Figure 10:
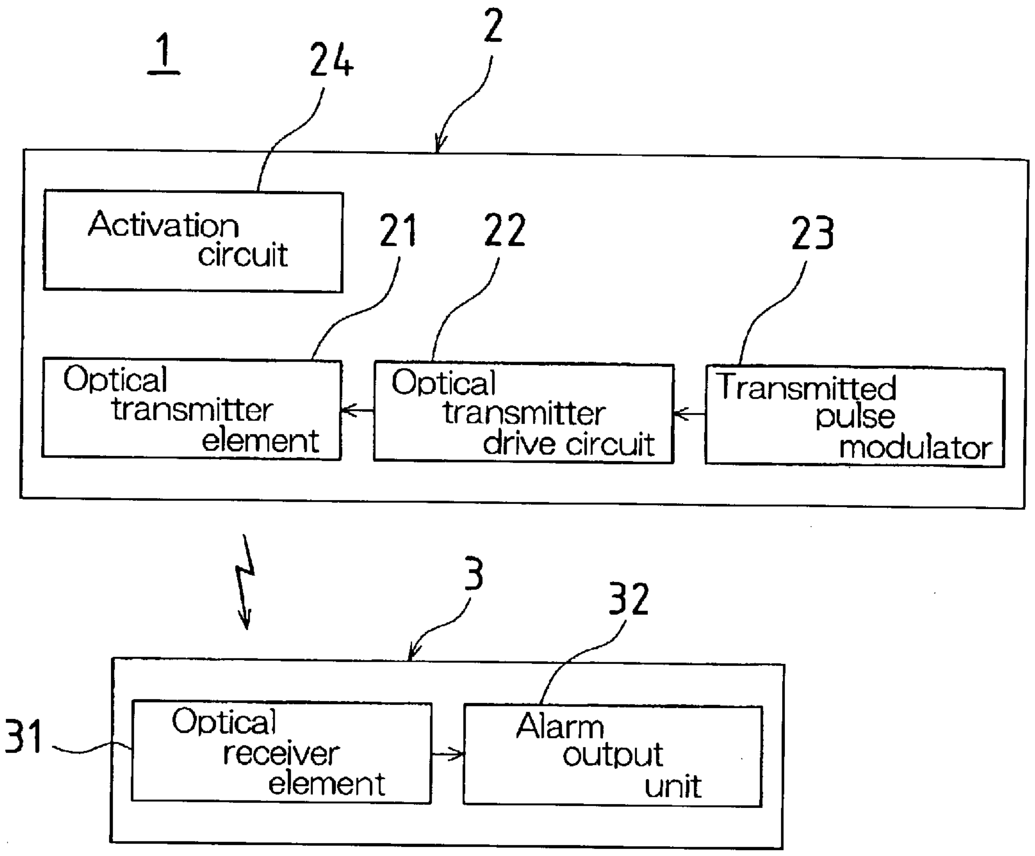
FIG. 10 is a block diagram showing the constitution of an active infrared sensor according to a third embodiment of the present invention.

As shown in FIG. 10, the optical transmitter 2 of the third embodiment is provided with activation circuit(s) 24 serving as activation means for activating the ability of the transmitted pulse modulator(s) 23 to vary the transmitted optical output. Optical transmission pattern(s) selected as described above is/are again selected through the action of this activation circuit 24 in correspondence to the environmental conditions and/or the conditions under which infrared sensor 1 is used, and such selected optical transmission pattern(s) is/are used to transmit a near-infrared beam toward the optical receiver 3.

The timing with which such an activation circuit 24 operates may be such that the activation circuit 24 operates at one or more prescribed preset times and/or as may be determined in correspondence to change(s) in ambient temperature, change(s) in ambient illumination, or the like.

This makes it possible for varying of the optical output of the transmitted infrared signal(s) to be carried out automatically, thereby eliminating the need for a user to perform operations for varying the transmitted optical output in correspondence to changes in the environment and/or conditions under which the infrared sensor 1 is used.

Furthermore, such an activation circuit 24 may be provided at optical receiver 3 instead of optical transmitter 2. Furthermore, activation circuits 24 may be provided at both optical transmitter 2 and optical receiver 3.

Furthermore, the activation circuit(s) 24 in accordance with the third embodiment may be provided at at least one optical transmitter 2 and/or at at least one optical receiver 3 of the foregoing second embodiment.

Fourth Embodiment

A fourth embodiment of the present invention will now be described. The fourth embodiment also relates to a constitution for causing the optical output of transmitted infrared signal(s) to be varied automatically. As the constitution of the fourth embodiment is in other respects similar to that of the foregoing first embodiment, the description of the fourth embodiment here will be confined to that structure which is responsible for causing the transmitted optical output to be varied automatically.

Figure 11:
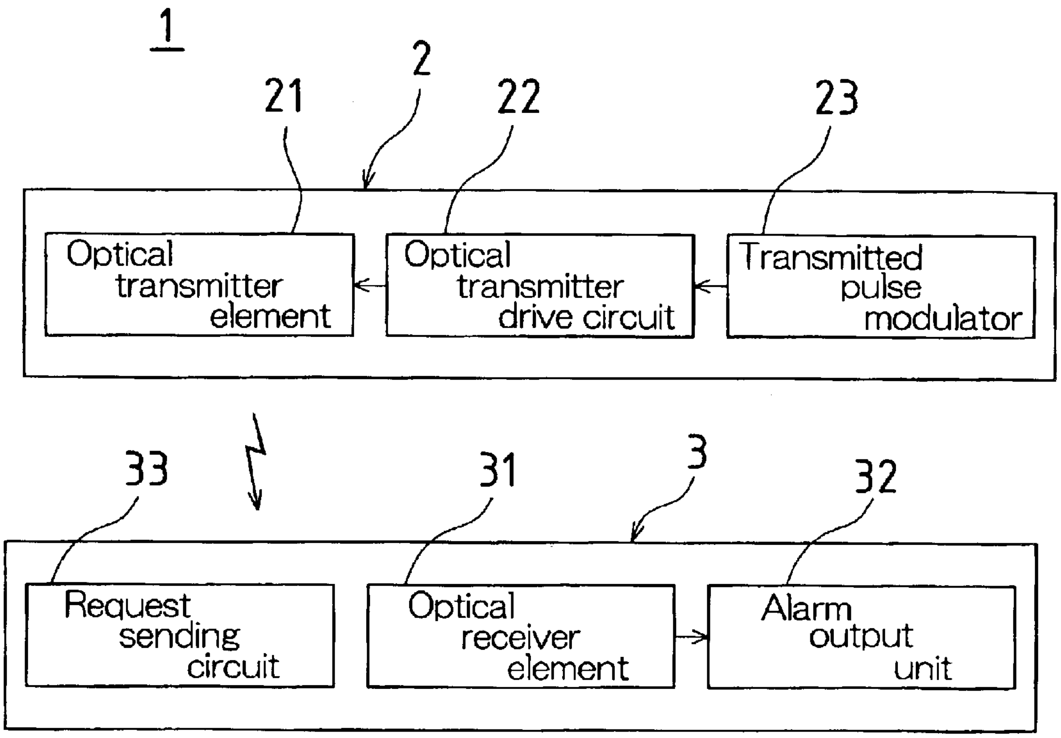
FIG. 11 is a block diagram showing the constitution of an active infrared sensor according to a fourth embodiment of the present invention.

As shown in FIG. 11, the optical receiver 3 of the fourth embodiment is provided with a request sending circuit 33 serving as request sending means capable of sending, to the optical transmitter 2, request signal(s) for requesting an action of functionality by means of which the transmitted pulse modulator(s) 23 varies/vary the transmitted optical output. Selected optical transmission pattern(s) is/are selected through the action of this request sending circuit 33 in correspondence to the environmental conditions and/or the conditions under which infrared sensor 1 is used, and such selected optical transmission pattern(s) is/are used to transmit a near-infrared beam toward the optical receiver 3.

The timing with which such a request sending circuit 33 operates may be such that the request sending circuit 33 operates as determined in correspondence to preset prescribed time(s) and/or the like.

The fourth embodiment also makes it possible for varying of the optical output of the transmitted infrared signal(s) to be carried out automatically, thereby eliminating the need for a user to perform operations for varying the transmitted optical output in correspondence to the environment and/or conditions under which the infrared sensor 1 is used.

In addition, in the fourth embodiment, request signal(s) may be sent from the request sending circuit 33 to the optical transmitter 2 either in wireless fashion and/or via wiring.

Furthermore, the request sending circuit(s) 33 in accordance with the fourth embodiment may be provided at the optical receiver(s) 3 of the foregoing second embodiment.

Other Embodiments

Whereas in the several foregoing embodiments the present invention has been described in terms of an example in which it is applied to a sensor such as may be used in a security system, the present invention is not limited thereto but may also be applied to a wide variety of applications, such as for use in sensors for activating ATMs (machines that automatically accept deposit of and/or dispense cash) which are installed at banks or the like, and so forth.

Furthermore, the active infrared sensor according the present invention is not limited to applications in which the object(s) being detected is/are person(s).

Moreover, the present application claims the right of the benefit of the prior filing date of Japanese Patent Application No. 2002-23104, the content of which is incorporated herein by reference in its entirety. Furthermore, all references cited in the present specification are specifically incorporated herein by reference in their entirety.

What is claimed is:

1. An active infrared sensor comprising:

optical transmitter means for transmitting at least one infrared signal toward one or more protected areas;

transmitted pulse modulation means for causing an optical output of the at least one infrared signal transmitted from said optical transmitter means to be made variable; and optical receiver means for receiving the at least one infrared signal transmitted from said optical transmitter means, said optical receiver means arranged on at least one optical axis of said optical transmitter means;

wherein entry of one or more objects into at least one protected area is detected when the at least one infrared signal transmitted from said optical transmitter means is interrupted;

wherein said optical transmitter means produces the at least one infrared signal by a repeated alternation between one or more infrared output periods and one or more infrared non-output periods such that a plurality of infrared pulses are output during at least one infrared output period;

wherein said transmitted pulse modulation means causes the optical output of the at least one infrared signal transmitted from said optical transmitter means to be made variable due to an adjustment of at least one ratio between an infrared pulse ON time and an infrared pulse OFF time during at least one infrared output period;

wherein a plurality of optical transmission patterns having mutually different ratios between infrared pulse ON times and infrared pulse OFF times are previously stored at said transmitted pulse modulation means;

wherein said transmitted pulse modulation means causes the optical output of the at least one infrared signal transmitted from said optical transmitter means to be made variable due to at least one infrared pulse output during at least one infrared output period being output in accordance with an optical transmission pattern selected from among the plurality of optical transmission patterns;

wherein at least one of said optical transmitter means and said optical receiver means comprises activation means for activating said transmitted pulse modulation means to vary the optical output of the at least one infrared signal transmitted from said optical transmitter means; and wherein said activation means is operated in correspondence to at least one of environmental conditions and conditions under which said active infrared sensor is used.

2. An active infrared sensor according to claim 1, wherein:

said optical transmitter means includes at least one optical transmitter unit operable to transmit the at least one infrared signal;

said transmitted pulse modulation means includes at least one transmitted pulse modulator unit operable to vary the optical output of the at least one infrared signal transmitted from said at least one optical transmitter unit;

said optical receiver means includes at least one optical receiver unit operable to receive the at least one infrared signal transmitted from said at least one optical transmitter unit, said at least one optical receiver unit being arranged on at least one optical axis of said at least one optical transmitter unit; and said activation means includes at least one activation unit operable to activate said at least one transmitted pulse modulator unit to vary the optical output of the at least one infrared signal transmitted from said at least one optical transmitter unit.

3. An active infrared sensor comprising:

optical transmitter means for transmitting at least one infrared signal toward one or more protected areas;

transmitted pulse modulation means for causing an optical output of the at least one infrared signal transmitted from said optical transmitter means to be made variable; and optical receiver means for receiving the at least one infrared signal transmitted from said optical transmitter means, said optical receiver means arranged on at least one optical axis of said optical transmitter means;

wherein entry of one or more objects into at least one protected area is detected when the at least one infrared signal transmitted from said optical transmitter means is interrupted;

wherein said optical transmitter means produces the at least one infrared signal by a repeated alternation between one or more infrared output periods and one or more infrared non-output periods such that a plurality of infrared pulses are output during at least one infrared output period;

wherein said transmitted pulse modulation means causes the optical output of the at least one infrared signal transmitted from said optical transmitter means to be made variable due to an adjustment of at least one ratio between an infrared pulse ON time and an infrared pulse OFF time during at least one infrared output period;

wherein said transmitted pulse modulation means comprises at least one first sending circuit operable to determine at least one frequency of at least one set of infrared pulses to be output during at least one infrared output period, and at least one second sending circuit operable to determine at least one duration of one or more ON times of one or more infrared pulses output during at least one infrared output period;

wherein at least one control signal from each of said at least one first sending circuit and said at least one second sending circuit are ANDed together;

wherein said transmitted pulse modulation means causes an optical output of the at least one infrared signal transmitted from said optical transmitter means to be made variable due to an output of at least one set of infrared pulses at the frequency determined by said at least one first sending circuit and the at least one duration of the one or more ON times during the at least one infrared output period determined by said at least one second sending circuit;

wherein at least one of said optical transmitter means and said optical receiver means comprises activation means for activating said transmitted pulse modulation means to vary the optical output of the at least one infrared signal transmitted from said optical transmitter means; and wherein said activation means is operated in correspondence to at least one of environmental conditions and conditions under which said active infrared sensor is used.

4. An active infrared sensor according to claim 3, wherein:

said optical transmitter means includes at least one optical transmitter unit operable to transmit the at least one infrared signal;

said transmitted pulse modulation means includes at least one transmitted pulse modulator unit operable to vary the optical output of the at least one infrared signal transmitted from said at least one optical transmitter unit;

said optical receiver means includes at least one optical receiver unit operable to receive the at least one infrared signal transmitted from said at least one optical transmitter unit, said at least one optical receiver unit being arranged on at least one optical axis of said at least one optical transmitter unit; and said activation means includes at least one activation unit operable to activate said at least one transmitted pulse modulator unit to vary the optical output of the at least one infrared signal transmitted from said at least one optical transmitter unit.

5. An active infrared sensor comprising:

optical transmitter means for transmitting at least one infrared signal toward one or more protected areas;

transmitted pulse modulation means for causing an optical output of the at least one infrared signal transmitted from said optical transmitter means to be made variable; and optical receiver means for receiving the at least one infrared signal transmitted from said optical transmitter means, said optical receiver means arranged on at least one optical axis of said optical transmitter means;

wherein entry of one or more objects into at least one protected area is detected when the at least one infrared signal transmitted from said optical transmitter means is interrupted;

wherein said optical transmitter means produces the at least one infrared signal by a repeated alternation between one or more infrared output periods and one or more infrared non-output periods such that a plurality of infrared pulses are output during at least one infrared output period;

wherein said transmitted pulse modulation means causes the optical output of the at least one infrared signal transmitted from said optical transmitter means to be made variable due to an adjustment of at least one ratio between an infrared pulse ON time and an infrared pulse OFF time during at least one infrared output period;

wherein a plurality of optical transmission patterns having mutually different ratios between infrared pulse ON times and infrared pulse OFF times are previously stored at said transmitted pulse modulation means;

wherein said transmitted pulse modulation means causes the optical output of the at least one infrared signal transmitted from said optical transmitter means to be made variable due to at least one infrared pulse output during at least one infrared output period being output in accordance with an optical transmission pattern selected from among the plurality of optical transmission patterns; and wherein said optical receiver means includes request sending means for sending, to said optical transmitter means, at least one request signal for requesting said transmitted pulse modulation means to vary the optical output of the at least one infrared signal transmitted from said optical transmitter means.

6. An active infrared sensor according to claim 5, wherein:

said optical transmitter means includes at least one optical transmitter unit operable to transmit the at least one infrared signal;

said transmitted pulse modulation means includes at least one transmitted pulse modulator unit operable to vary the optical output of the at least one infrared signal transmitted from said at least one optical transmitter unit;

said optical receiver means includes at least one optical receiver unit operable to receive the at least one infrared signal transmitted from said at least one optical transmitter unit, said at least one optical receiver unit being arranged on at least one optical axis of said at least one optical transmitter unit; and said request sending means includes at least one request sending unit operable to send, to said at least one optical transmitter unit, at least one request signal for requesting said at least one pulse modulator unit to vary the optical output of the at least one infrared signal transmitted from said at least one optical transmitter unit.

7. An active infrared sensor comprising:

optical transmitter means for transmitting at least one infrared signal toward one or more protected areas;

transmitted pulse modulation means for causing an optical output of the at least one infrared signal transmitted from said optical transmitter means to be made variable; and optical receiver means for receiving the at least one infrared signal transmitted from said optical transmitter means, said optical receiver means arranged on at least one optical axis of said optical transmitter means;

wherein entry of one or more objects into at least one protected area is detected when the at least one infrared signal transmitted from said optical transmitter means is interrupted;

wherein said optical transmitter means produces the at least one infrared signal by a repeated alternation between one or more infrared output periods and one or more infrared non-output periods such that a plurality of infrared pulses are output during at least one infrared output period;

wherein said transmitted pulse modulation means causes the optical output of the at least one infrared signal transmitted from said optical transmitter means to be made variable due to an adjustment of at least one ratio between an infrared pulse ON time and an infrared pulse OFF time during at least one infrared output period;

wherein said transmitted pulse modulation means comprises at least one first sending circuit operable to determine at least one frequency of at least one set of infrared pulses to be output during at least one infrared output period, and at least one second sending circuit operable to determine at least one duration of one or more ON times of one or more infrared pulses output during at least one infrared output period;

wherein at least one control signal from each of said at least one first sending circuit and said at least one second sending circuit are ANDed together;

wherein said transmitted pulse modulation means causes an optical output of the at least one infrared signal transmitted from said optical transmitter means to be made variable due to an output of at least one set of infrared pulses at the frequency determined by said at least one first sending circuit and the at least one duration of the one or more ON times during the at least one infrared output period determined by said at least one second sending circuit; and wherein said optical receiver means includes request sending means for sending, to said optical transmitter means, at least one request signal for requesting said transmitted pulse modulation means to vary the optical output of the at least one infrared signal transmitted from said optical transmitter means.

8. An active infrared sensor according to claim 7, wherein:

said optical transmitter means includes at least one optical transmitter unit operable to transmit the at least one infrared signal;

said transmitted pulse modulation means includes at least one transmitted pulse modulator unit operable to vary the optical output of the at least one infrared signal transmitted from said at least one optical transmitter unit;

said optical receiver means includes at least one optical receiver unit operable to receive the at least one infrared signal transmitted from said at least one optical transmitter unit, said at least one optical receiver unit being arranged on at least one optical axis of said at least one optical transmitter unit; and said request sending means includes at least one request sending unit operable to send, to said at least one optical transmitter unit, at least one request signal for requesting said at least one pulse modulator unit to vary the optical output of the at least one infrared signal transmitted from said at least one optical transmitter unit.

* * * * *